United States Patent

[11] 3,530,946

[72] Inventor Mederic J. Major,
1218 Hammond Ave., New Westminster,
British Columbia, Canada
[21] Appl. No. 723,822
[22] Filed April 24, 1968
[45] Patented Sept. 29, 1970

[54] ROTARY CULTIVATOR
9 Claims, 4 Drawing Figs.

[52] U.S. Cl. .................................................. 172/96,
172/265; 172/544; 172/706
[51] Int. Cl. ............................................... A01b 33/00
[50] Field of Search ........................................... 172/95, 96,
117, 264, 265, 269, 270, 543, 544, 545, 706, 705;
16/141, 144, 182

[56] References Cited
UNITED STATES PATENTS

| 790,410 | 5/1905 | Warne | 172/269X |
| 1,050,923 | 1/1913 | DeViese | 172/96X |
| 2,506,443 | 5/1950 | Court | 172/265 |
| 2,751,831 | 6/1956 | Null | 172/96X |
| 2,999,268 | 9/1961 | Strandegen | 16/141 |
| 3,295,589 | 1/1967 | Pfleger et al. | 16/182X |

Primary Examiner—Robert E. Pulfrey
Assistant Examiner—James W. Peterson
Attorney—Fetherstonhaugh and Co.

ABSTRACT: A rotary cultivator having a rotable driven member upon which a digging tool is rotatably journalled for rotation about an axis parallel to but off-center relative to the axis of the member for swinging movement between an extended position and a retracted position. A follower is slidably mounted on the tool and is spring-urged radially inwardly against a cam which moves the follower radially outwardly against a spring as the tool is moved from its extended to its retracted position. The cam is convexly curved so that the effective resistance of the spring to the rotation of the tool diminishes as the tool is moved away from its extended position.

Patented Sept. 29, 1970
3,530,946
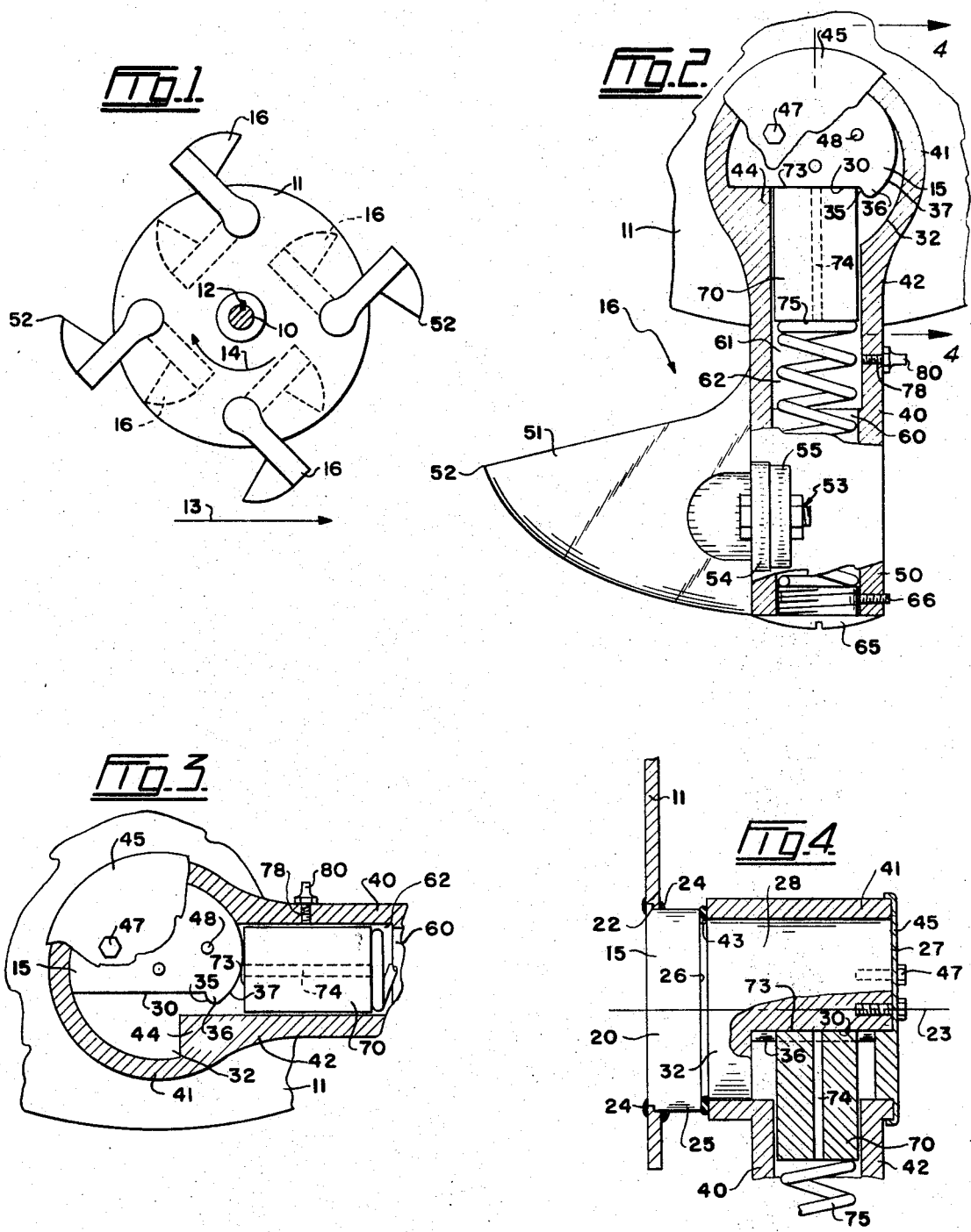

ROTARY CULTIVATOR

BACKGROUND OF THE INVENTION

This invention relates to cultivators and particularly cultivators of the rotary type wherein a plurality of digging tools are rotated consecutively into engagement with the ground surface to be tilled as the cultivator is moved.

This type of cultivator is constructed so that the digging tools, upon encountering an immovable ground obstruction such as a heavy stone, will retract to clear the latter so as not to damage the cultivator and after having cleared, will automatically return to an extended operating position. The digging tools and their operating mechanism have usually included a spring which continually urges the tools to their extended position and which will give to permit the tools to rotate to retracted positions upon encountering an immovable object. In order to provide for retractive movement of the teeth against their springs, many cultivators have been provided with specially designed linkage which will increase the mechanical advantage of the teeth against their springs as the teeth move from their extended position whereby the resistance to rotation of the teeth diminishes as they are moved to their retracted positions.

Cultivators of prior art utilizing linkages of this nature have been constructed so that the linkages are exposed to earth, rocks and other debris and the moving parts thereof have been subject to wear and jamming. Furthermore, prior art cultivators employing this linkage have been relatively costly to build and difficult to maintain and adjust.

SUMMARY OF THE INVENTION

The present invention provides a rotary cultivator of the last-mentioned type in which the linkage or mechanism operating the tool is completely enclosed within the tool itself and is therefore fully protected from damage or derangement by debris thrown up by the cultivator.

The cultivator of the present invention, furthermore, is strong yet has very few working parts and is therefore relatively cheap to manufacture and maintain and adjust.

The operating mechanism of the present invention is also arranged to provide high initial resistance of the digging tools to movement out of their retracted positions and thereafter permit easy yielded movement of the tools to their retracted positions.

The present invention comprises a driven member rotatable about a horizontal axis, a radially elongated digging tool mounted at, one end on, the driven member for swinging movement about an axis parallel to the rotational axis of the latter between a radially extended position and a retracted position, a cam follower slidably mounted on the digging tool for radial movement relative thereto, resilient means reacting against the tool and follower for yieldably resisting radially outward movement of the latter, and a cam having a camming surface against which the follower slidably bears for moving the latter radially outwardly against the action of the resilient means when the tool is swung from its extended to its retracted position, said camming surface extending as a convex curve so that the effective resistance of the resilient means to rotational movement of the tool diminishes as the tool moves away from its extended position.

BRIEF DESCRIPTION OF THE DRAWINGS

FIG. 1 is a side view of part of the cultivator showing the rotatable member and digging tools thereon, FIG. 2 is an enlarged side view, partially in section, of a digging tool in its radially extending position, FIG. 3 is a view similar to FIG. 2 illustrating partially, a digging tool in a retracted position, and FIG. 4 is a sectional view taken along line 4—4 of FIG. 2.

DESCRIPTION OF THE PREFERRED EMBODIMENTS

The apparatus herein disclosed is particularly designed for use on a cultivating machine movable over a ground surface and having a rotatable, horizontal, power driven shaft. As machines of this type are well known, it is not considered necessary to describe or show herein the details of its construction, it being sufficient for the purposes of the present invention to understand that the shaft is carried by a frame which is supported by ground wheels and is power driven to rotate in the same direction as the ground wheels.

Referring to the drawings, the numeral 10 designates the power driven rotatable shaft on which a plurality of discs 11 (one being shown) are nonrotatably mounted as by a key and slot arrangement 12. The cultivator is normally moved in the direction indicated by the arrow 13 and the shaft is rotated in the direction indicated by the arrow 14. Rotatably mounted on laterally extending bosses 15 nonrotatably secured to the disc 11, which is a relatively thick steel plate, are digging tools 16 (four being shown) which, under the influence of centrifugal forces as the disc 11 is rotated and under the action of operating mechanism, hereinafter to be described, normally assume an extended position as shown in solid lines in FIG. 1 and when striking an immovable object rotate towards a retracted position as shown in dotted lines in the latter FIG.

Referring to FIGS. 2 and 4, one of the bosses 15 and a digging tool 16 are shown in detail.

The boss 15 is generally cylindrical in shape and fits at one end 20 into an aperture 22 formed in the disc near the peripheral edge of the latter so as to project laterally therefrom with its longitudinal axis 23 normal to the plane of the disc and is welded rigidly to the latter as at 24. The boss has a short thick cylindrical root section 25 extending a short distance outwardly from the disc 11 terminating in annular shoulder 26, said boss being reduced in diameter at said annular shoulder to form an elongated cylindrical spindle 28. This spindle is machined to provide a flat, centrally located seat 30 extending parallel to the longitudinal axis 23. This seat terminates short of the shoulder 26 so that the spindle 28 has a short cylindrical section 32. The seat 30 terminates at its trailing edge 35 in a raised arcuate lip 36. The lip 36 eases into a convexially curvate camming surface 37 which eases gradually into the true cylindrical surface of the spindle 28.

The digging tool 16 is formed having an elongated shank 40 having an enlarged annular hub 41 at one end 42 thereof which rotatably fits over the spindle 28 and slidably and sealably bears against a washer 43 fitted against the shoulder 26. The hub 41 is provided with an internal stop 44 for engaging the seat 30 and is maintained in position on the spindle 28 by means of a retaining cap 45 fitted against the free end 27 of the boss and secured in place by means of machine bolts 47 extended through the cap into suitably tapped holes 48 in the boss. This cap 45 slidably and sealably fits against the hub 41.

At the free or other end 50 of the shank, a pointed digging tooth 51 having a tip 52 is detachably secured by means of a nut and bolt type connector 53 passed through cooperating apertured flanges 54 and 55 formed on the digging tooth and shank respectively.

The shank is provided with an axially and radially extending bore 60 which terminates at one end 61 in an elongated guide passage 62 of square cross-section, said guide passage opening out into the hub 41 in confronting relationship to the seat 30 and camming surface 37. The bore also opens out of the free end of the shank and is internally threaded to threadedly receive an externally threaded plug 65 which may be secured against rotation by means of a set screw 66.

Slidably mounted in the guide passage 62 is a cam follower 70, said follower being elongated in a radial direction and having a square cross-sectional configuration so as to have a tight yet slidable and nonrotatable fit in the guide passage 62. The base 73 of the follower faces the spindle extending in a plane normal to the axis of the guide passage and is chamfered at its edges. The follower is also provided with a longitudinally extending centrally located passage 74 the diameter of which is sufficient to provide easy flow of a light lubricating grease therethrough. A coiled compression spring 75 located in the bore extends under compression between the plug 65 and follower 70 urging the latter into slidably engagement with the seat and camming surface of the spindle 28.

In order to lubricate the digging tool 16, a passage 78 is drilled through the shank to intersect the bore and is provided with a grease-fitting 80. Sufficient light lubricating grease is applied through the grease-fitting 80 to completely fill the bore and, via passage 74, the space between the hub 41 and spindle 28.

The operation of the digging tool may be best described with reference to FIGS. 1, 2 and 3.

During a tilling or cultivating operation the centrifugal forces acting on the tool will tend to induce the latter to assume a position in which its center of gravity is aligned with its axis of rotation and the axis of rotation of the shaft 10. The preferred position of the tool in its extended position, however, is such that the tip 52 of the tooth is aligned with the aforementioned axes of rotation in that when the tool starts to move to a retracted position its tip will move inwardly towards the periphery of the disc 11.

The boss is therefore angularly arranged so that the stop 44 will engage the seat 30 with the face of the cam follower 70 flush against the latter to prevent movement of the tooth, under centrifugal force, beyond the preferred extended position.

The tool will normally assume its extended position when working. When the tool meets an obstruction sufficiently heavy enough to cause it to rotate, the follower will attempt to climb over the lip 36. However, in order to do this, the follower must move outwardly against the action of the compression spring 75. As it is not intended that the tool shall move from its extended position under ordinary working conditions where, for example, only small stones are encountered, a compression spring is chosen having sufficient strength to permit the follower to climb over the lip only when the digging tool encounters an object of sufficient weight and size which would lift the entire cultivator if the digging tool were not able to retract.

The initial resistance to retractive rotation of the digging tool is therefore relatively high, however, once the follower has moved onto the camming surface 37, the resistance offered by the spring and follower to further rotation of the digging tool diminishes as the tool moves towards its retracted position. It will be seen, with reference to FIGS. 2 and 3, that due to the curved aspect of the camming surface 37, the mechanical advantage of the digging tool against the spring increases as the tool is rotated towards its retracted position, which, consequently results in a steadily diminishing effective resistance of the spring to rotation of the tooth as the latter is moved towards said retracted position. When the cultivator has moved sufficiently to permit the digging tool to clear the obstruction, the tool, under the action of the follower against the camming surface and also under the action of centrifugal forces, will immediately return to its extended position.

During the working of the cultivator, stones and roots and the like are thrown upwardly into the air and consequently, are a hazard in that they tend to cause jamming of the operating linkage of conventional digging tools. In the present invention, as herein described, all the operating components of the digging tool such as the cam follower and spring, are hidden within the tool itself so that jamming by rocks and the like is impossible. Furthermore, the working components of the digging tool are protected from damage due to abrasive materials as the tool is fully sealed by the cap 45 and seal 43. Lubrication of the working components, furthermore, is assured as the cam follower 70 acts in the nature of a pump as it reciprocally moves in the guide passage 62 due to rotational movement of the digging tool, thereby forcing the lubricant through the passage 74.

I claim:

1. Rotary cultivator apparatus comprising a driven member rotatable about a horizontal axis, a cylindrical boss projecting laterally from the driven member and offset from the rotational axis of the latter and having a camming surface formed thereon, a radially elongated digging tool swingably journalled at one end on the boss for rotative movement about an axis parallel to the rotational axis of the driven member, said tool having a radial bore opening outwardly at one end to the camming surface and being closed at its other end, a cam follower slidably mounted in the bore for slidably engaging the camming surface and movable radially outwardly of the latter as the tool is moved from its extended position towards its retracted position, a compression spring mounted in the bore between the closed end thereof and the follower for yieldably resisting radial outward movement of the follower, said camming surface having a sharp rise at the beginning of the movement from the extended to the retracted position to give a high resistance to movement of the tool from the extended position.

2. Rotary cultivator apparatus as claimed in claim 1 including a seat formed in the boss extending in a plane normal to the axis of the bore for seating the follower when the tool is in its extended position and a raised lip at one edge of the seat forming part of the camming surface of the boss, the height of said lift and the length of its camming surface being sufficient to permit the follower to move against the action of the spring only under rotational pressures against the tool exceeding a predetermined value.

3. Rotary cultivator apparatus as claimed in claim 1 including an annular shoulder encircling the boss against which one side of the tool slidably and sealably fits and a cap detachably secured to the free end of the boss having a slidable sealing fit against the other side of the tool so as to maintain the tool on the boss.

4. Rotary cultivator apparatus as claimed in claim 1 including a lubricating injection passage formed in the tool intersecting the radial bore, said passage being provided with a lubricating fitting to facilitate the injection of lubricant into the bore, said cam follower having a lubricating passage formed therethrough to permit the passage of lubricant therethrough as the follower moves in the bore.

5. Rotary cultivator apparatus as claimed in claim 1 in which the bore is internally threaded at its end opposite its said one end and including a plug having corresponding screw threads engaging the threads of the bore whereby said plug will be radially adjustable so as to permit compression adjustment of the spring.

6. Rotary cultivator apparatus as claimed in claim 1 in which the driven member comprised a disc, the peripheral edge of which is above the ground surface to be tilled and the digging tool, in the retracted position is wholly within the periphery of the disc.

7. Rotary cultivator apparatus as claimed in claim 1 in which the digging tool comprises an elongated shank having a cylindrical hub at one end for rotatably fitting over the boss and a digging tool detachably connected to the other end thereof.

8. Rotary cultivator apparatus as claimed in claim 1 in which said one end of the bore and the follower have a matching non-circular cross-section so as to prohibit rotation of the follower in the bore.

9. Rotary cultivator apparatus as claimed in claim 1 including a stop engagable by the follower when the tool is in its extended position to prevent rotation of the tool in a direction opposite to the direction that the tool rotates when moving to its retracted position.